United States Patent
Yang

(10) Patent No.: US 6,256,075 B1
(45) Date of Patent: Jul. 3, 2001

(54) VESA COVER SECURING STRUCTURE FOR LCD MONITOR

(75) Inventor: Dong-Wook Yang, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/409,057

(22) Filed: Sep. 30, 1999

(30) Foreign Application Priority Data

May 1, 1999 (KR) .................................................. 15767/99

(51) Int. Cl.[7] ....................................................... H04N 5/64
(52) U.S. Cl. ........................... 348/843; 312/7.2; 403/282; 403/388; 348/836
(58) Field of Search ..................................... 348/794, 836, 348/837, 838, 839, 840, 841, 842, 843, 787, 789; 312/7.2, 265.5, 223.1, 223.2, 223.3; 403/282, 388, 386, 279; 411/183, 180; 349/58

(56) References Cited

U.S. PATENT DOCUMENTS

| | | | |
|---|---|---|---|
| 2,276,049 | * | 3/1942 | Leighton ........................... 411/180 X |
| 3,451,303 | * | 6/1969 | Biermann ......................... 411/183 X |
| 3,497,074 | * | 2/1970 | Shaheen ........................... 312/234 X |
| 5,119,204 | * | 6/1992 | Hashimoto et al. .................. 348/794 |
| 5,299,017 | * | 3/1994 | Furuno .............................. 312/7.2 X |

FOREIGN PATENT DOCUMENTS

| | | | |
|---|---|---|---|
| 58223121 | * | 12/1983 | (JP) . |
| 9288456 | * | 11/1997 | (JP) . |
| 10174021 | * | 6/1998 | (JP) . |
| 1124577 | * | 1/1999 | (JP) . |
| 11344934 | * | 12/1999 | (JP) . |

* cited by examiner

Primary Examiner—Peter M. Cuomo
Assistant Examiner—Hanh V. Tran
(74) Attorney, Agent, or Firm—Robert E. Bushnell, Esq.

(57) ABSTRACT

A securing structure for VESA cover of a LCD monitor. The securing structure has a rear cover, a VESA cover, a shield, and a plurality of extended nuts. The rear cover has a depression formed on a predetermined location of the rear surface. A plurality of first through holes are formed at an indented portion of the depression. The VESA cover has a plurality of second through holes formed at locations corresponding to the first through holes and the second through holes engage the depression of the rear cover. The shield is placed at inner side of the rear cover and has a plurality of third through holes at locations corresponding to the first and the second through holes. The extended nuts are inserted into the third holes of the shield. Engaging screws penetrate the first and the second through holes and engage the extended nuts so that said VESA cover is installed onto the squared depression of the rear cover.

12 Claims, 5 Drawing Sheets

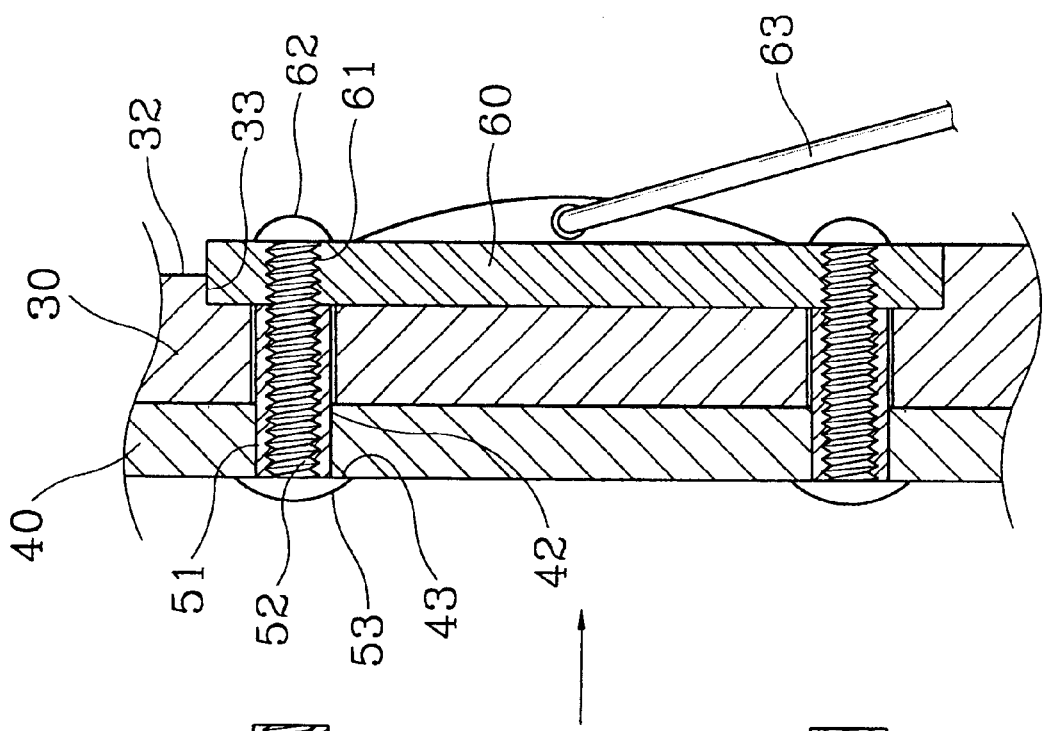
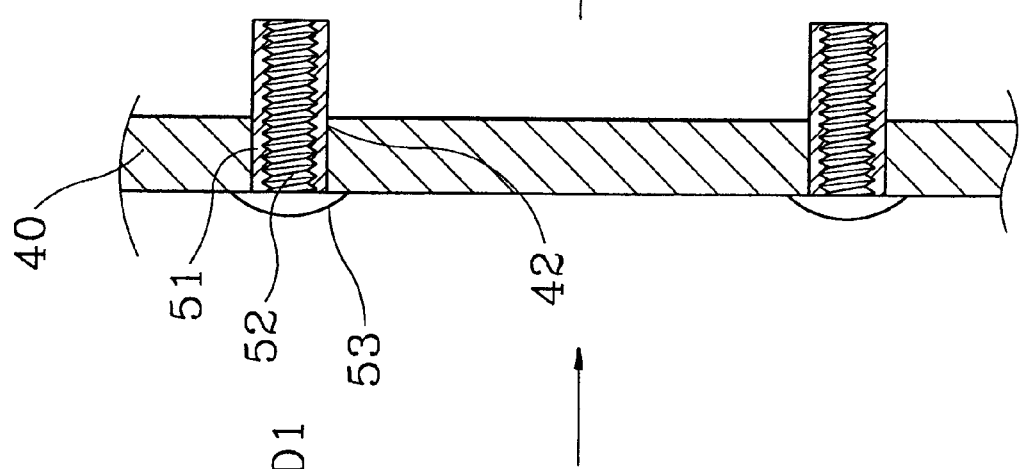
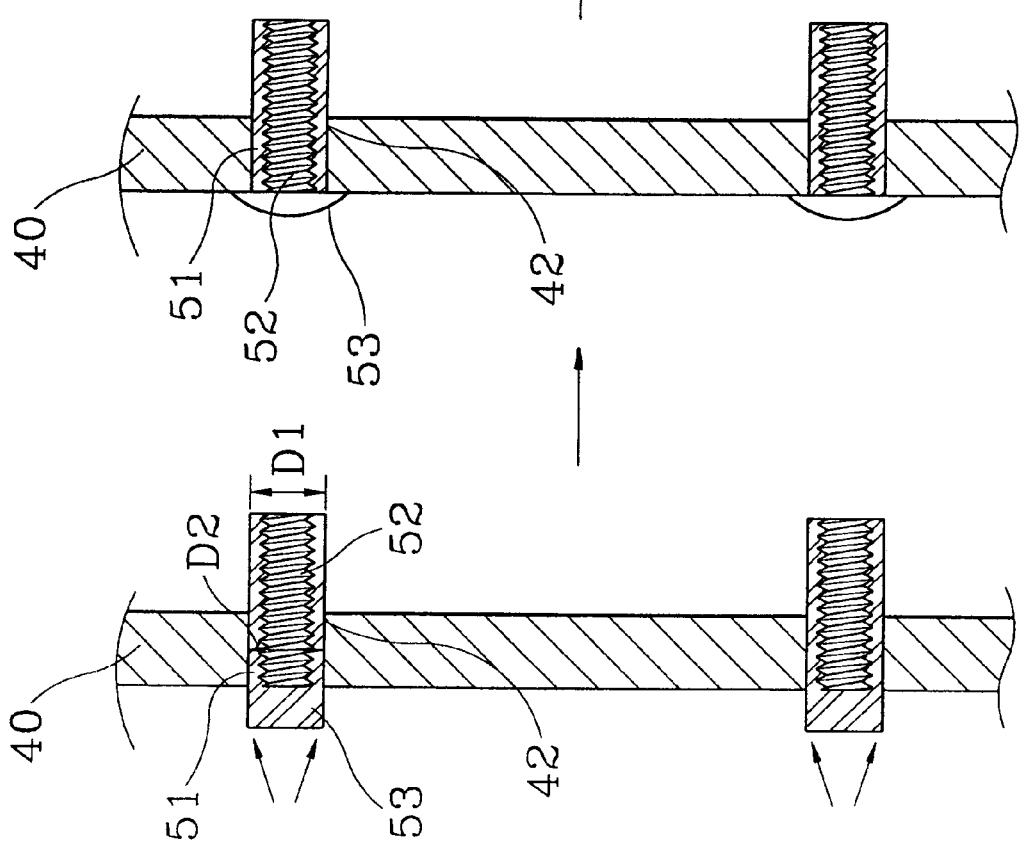

VESA COVER SECURING STRUCTURE FOR LCD MONITOR

CLAIM OF PRIORITY

This application makes reference to, incorporates the same herein, and claims all benefits accruing under 35 U.S.C. § 119 from my application VESA COVER SECURING STRUCTURE FOR LCD MONITOR filed with the Korean Industrial Property Office on May 1, 1999 and there duly assigned Serial No. 99-15767.

BACKGROUND OF THE INVENTION

1. Field of the Invention

The present invention relates to LCD monitors, specifically to a VESA cover installed at the back of an LCD monitor.

2. Description of the Prior Art

Generally, a liquid crystal display (LCD) monitor is a device which displays images by applying a voltage to a liquid crystal to change the molecular structures thereof, thereby changing the optical characteristic of the liquid crystal. LCD monitors are installed on television sets, computers, video cameras and other devices in order to reduce the size of the device for portability, and to save electricity. In particular, the LCD monitors for computers and televisions have a small enough size to enable the monitor to be placed on a desk or be hung up on a wall. Such monitors normally have a handle hinged to a VESA (Video Electronics Standards Association) cover installed at the back of the monitor.

In a generally used LCD monitor, a square depression is formed at the rear middle portion of the rear cover of the LCD monitor. The VESA cover is installed on the square depression. At the four corners of the square depression, bosses protrude rearward. These bosses comprise cylindrical bodies, and a plurality of supporting members formed integrally with lower portions of bodies of the bodies. Insert members with screws formed therein are inserted into the inner peripheries of the bodies.

A plurality of through holes are formed on the four corners of the VESA cover. Therefore, when the VESA cover engages the square depression, a plurality of screws penetrates the through holes and engages the bosses so that the VESA cover engages the square depression of the rear cover.

However, when forming the LCD monitor, such a securing structure of the VESA cover is formed simultaneously with a plurality of bosses with the members inserted therein, complicating the manufacturing process and raising the cost for the production.

SUMMARY OF THE INVENTION

It is therefore an object of the present invention to provide an improved VESA cover for a liquid crystal display monitor.

It is a further object of the present invention to provide a VESA cover which is less complicated to manufacture.

It is a still further object of the present invention to provide a VESA cover which does not require separate injection molded parts such as bosses.

It is a yet further object of the present invention to provide a VESA cover which is less expensive to manufacture.

The above and other objects, advantages and features of the present invention will become more readily appreciated and understood from a consideration of the following detailed description of a preferred embodiment of this invention when taken together with the accompanying drawings.

In order to achieve above objects, a securing structure of VESA cover of a LCD monitor according to the present invention comprises: a rear cover with a depression formed on a predetermined location of the rear surface, a plurality of first through holes formed at an indented portion of the depression; a VESA cover having a plurality of second through holes formed at locations corresponding to the first through holes, said second through holes engaging the depression of the rear cover; a shield placed at inner side of the rear cover, said shield having a plurality of third through holes at locations corresponding to the first and the second through holes; and a plurality of extended nuts inserted into the third holes of the shield, wherein a plurality of engaging screws penetrate the first and the second through holes and engaging the extended nuts so that said VESA cover is installed onto the squared depression of the rear cover.

Preferably, the extended nut has a cylindrical body and a screw thread formed on the inner periphery thereof, and a head portion protruding along the outer periphery of the body, and the body of said extended nuts is inserted into the through holes, securing the shield.

More preferably, the outer diameter of the body of the extended nut is larger than outer diameter of the third through hole so that said extended nut is contacting and expending the inner periphery of the third through hole when the extended nut is inserted into the through hole.

The securing structure for the VESA cover involves extended nuts engaging the VESA cover and the rear cover, facilitating the assembly process. Furthermore, since separate parts formed by injection molding are not needed, this reduces the product cost.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein:

FIGS. 5A–5C illustrate the VESA cover installed integrally with the shield of the LCD monitor.

DETAILED DESCRIPTION OF THE DRAWINGS

Figure 1:
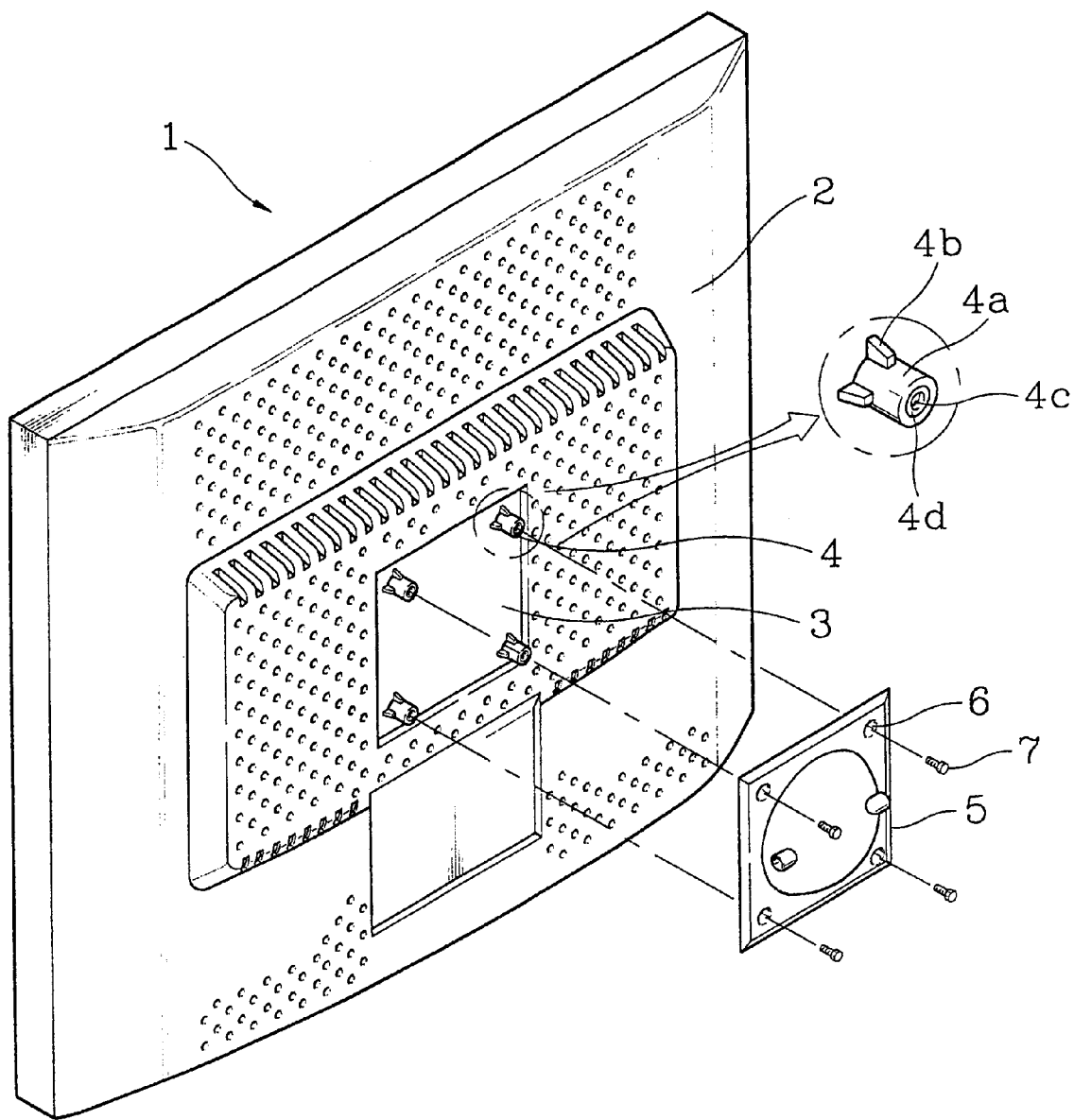
FIG. 1 is an exploded perspective view showing a VESA cover installed at the rear surface of a LCD monitor generally used.

Turning now to the drawings, FIG. 1 is a perspective view showing a VESA cover installed at the back of a generally used LCD monitor. As can be seen, a square depression 3 is formed at the rear middle portion of the rear cover 2 of the LCD monitor 1. The VESA cover 5 is installed on the square depression 3. At the four corners of the square depression 3, bosses 4 protrude rearward. These bosses 4 comprise cylindrical bodies 4a, and a plurality of supporting members 4b formed integrally with lower portions of bodies 4a of the bodies 4a. Insert members 4d with screws 4c formed therein are inserted into the inner peripheries of the bodies 4a.

A plurality of through holes 6 are formed on the four corners of the VESA cover 5. Therefore, when the VESA cover engages the square depression 3, a plurality of screws 7 penetrates the through holes 6 and engages the bosses so that the VESA cover 5 engages the square depression 3 of the rear cover 2.

As noted above, when forming the LCD monitor, such a securing structure of the VESA cover is formed simultaneously with a plurality of bosses with the members inserted therein, complicating the manufacturing process and raising the cost for the production.

The present invention will now be described in detail referring to the accompanying drawings. However, the embodiments hereinafter described should be interpreted as illustrative and in no sense limiting.

Figure 2:
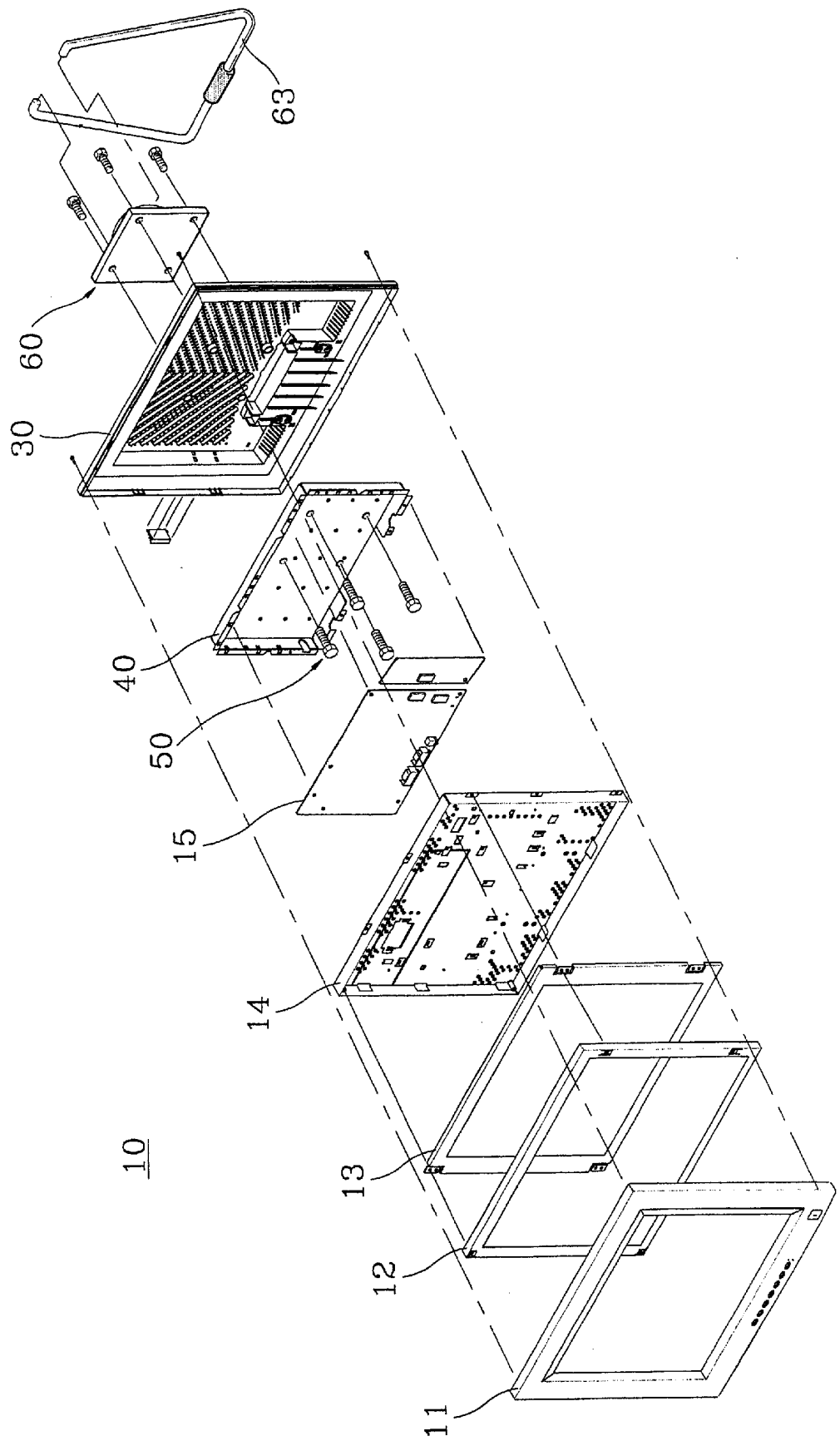
FIG. 2 is an exploded perspective view showing the structure of the LCD monitor according to the present invention.

FIG. 2 is an exploded perspective showing the structure of the LCD monitor according to the present invention. As can be seen, the LCD monitor 10 comprises a front cover 11, a rear cover 30 engaging the front cover 11 forming the outer case of the LCD monitor 10, an LCD panel 13 placed between the front cover 11 and the rear cover to display images, a front bracket 12 supporting the front portion of the LCD panel 13, a rear bracket 14 supporting the rear portion of the LCD panel 13, a main printed circuit board 15 applying electric signals to the LCD panel 13, and a shield 40 blocking the electromagnetic waves generated from the LCD panel 13.

The VESA cover 60 to which a handle 63 is installed is integrally installed at the rear surface (numeral 32 of FIG. 3) of the rear cover 30. Installation of the VESA cover 60 to the rear surface 32 of the rear cover 30 will be described referring to FIG. 3.

Figure 3:
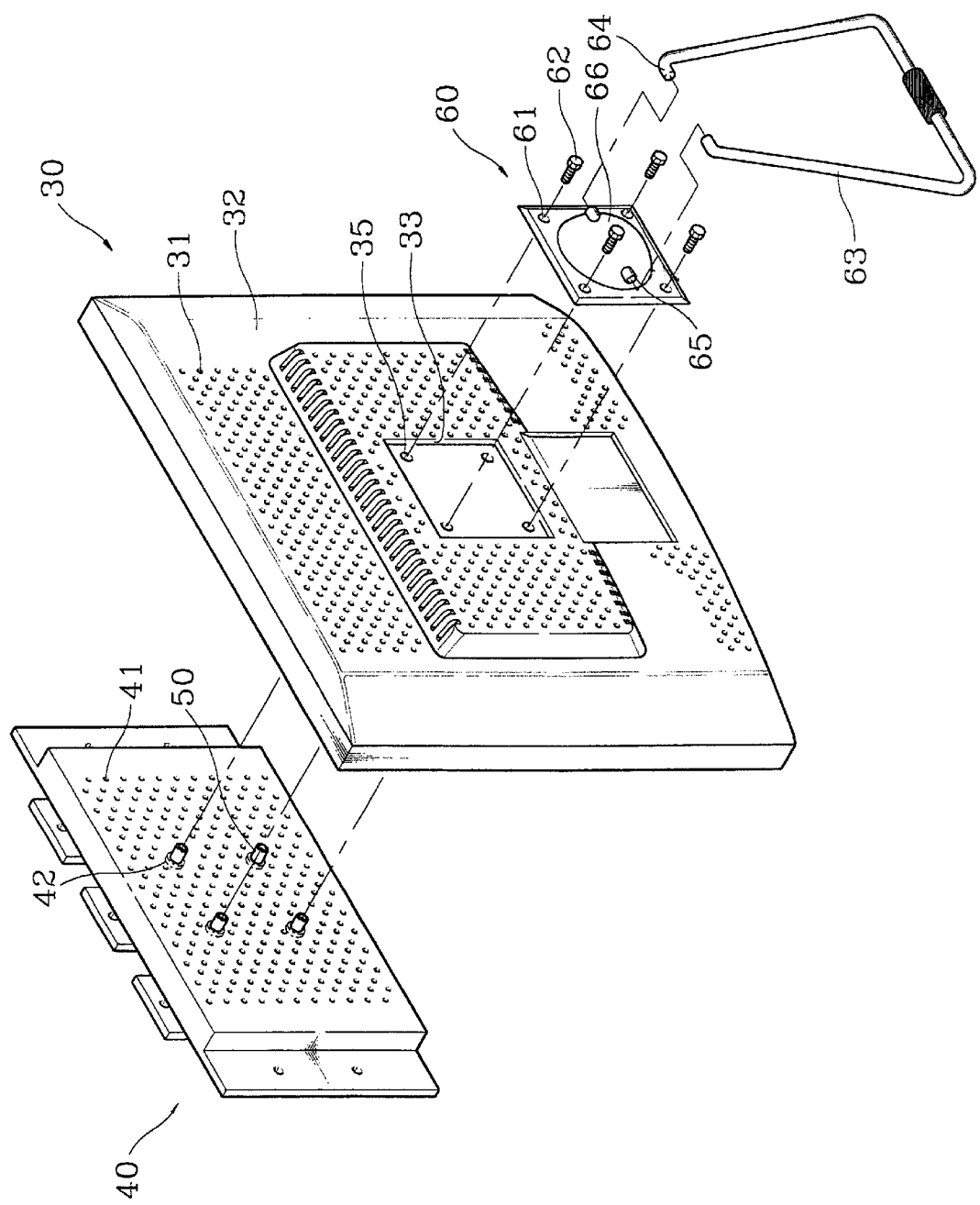
FIG. 3 is an exploded perspective view showing the VESA cover installed at the rear surface of the LCD monitor according to the present invention.
Figure 4:
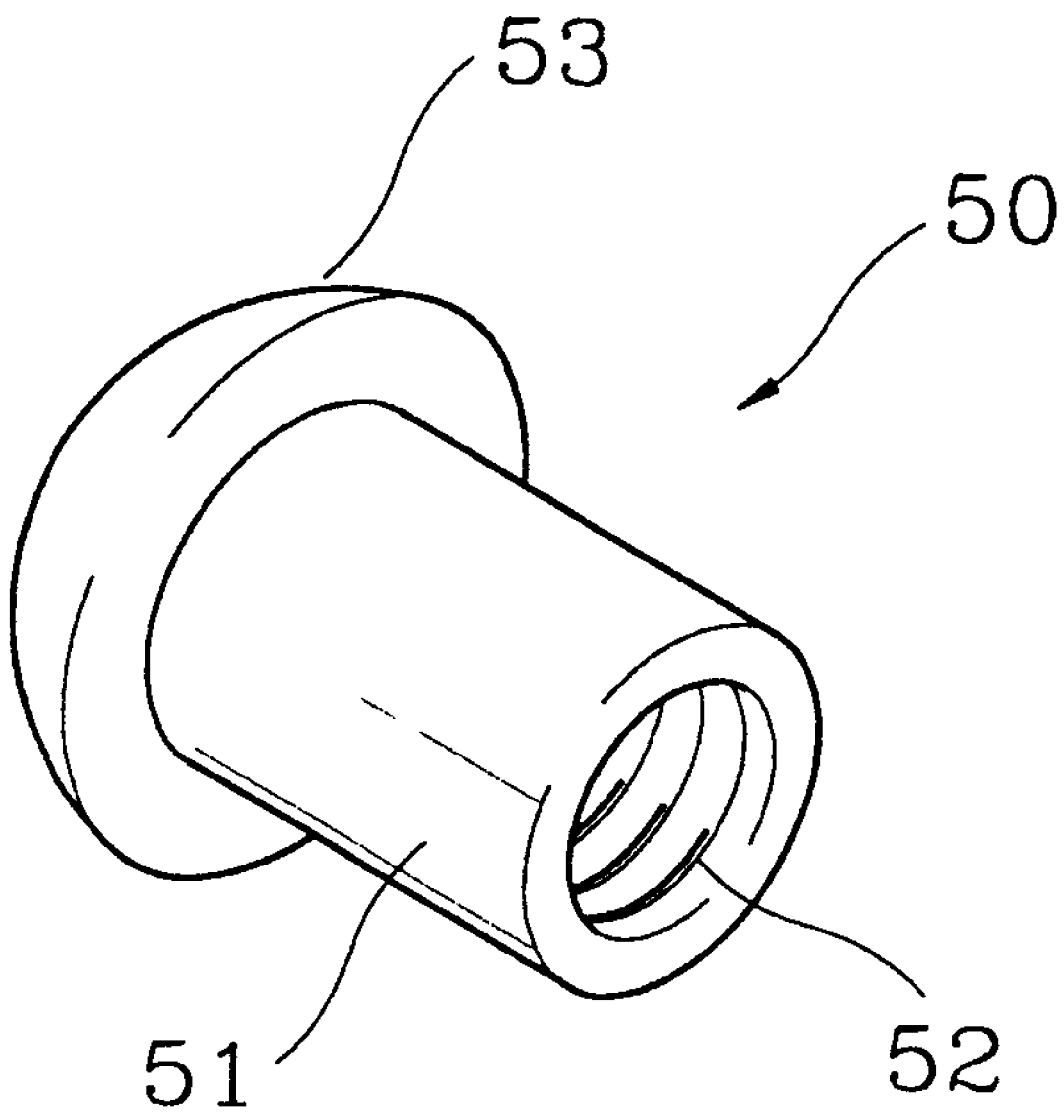
FIG. 4 is a perspective view showing the extended nuts according to the present invention.

FIG. 3 is an exploded perspective view showing the VESA cover installed at the rear side of the LCD monitor according to the present invention. FIG. 4 is a perspective view showing an extended nut according to the present invention.

As can be seen, the rear cover 30 is a square plate with a plurality of ventilation holes 31 formed on the rear surface 32 to dissipate hear generated within the LCD monitor (numeral 10 of FIG. 2).

A depression, preferably a square depression 33 is formed at middle portion of the rear cover 30 on which the VESA cover is installed. The square depression 33 is formed by indenting the rear surface 32 of the rear cover 30 to a predetermined depth. A plurality of first through holes 35 are formed on four corners of the square depression. The first through holes are separated by a certain distance according to the VESA standards.

The VESA cover 60 is square and engages the square depression 33 of the rear cover 30. A circular groove is formed at the rear surface of the VESA cover 60 to which a hinge portion (not shown) securing the handle 63 is installed in a pivoting manner. Therefore, both ends 64 of the handle 63 are installed on the hinge portion(not shown) through the holes 65 formed on both sides of a cap 66.

A plurality of through holes 61 are formed on the four corners of the VESA cover 60. Therefore, engaging screws 62 penetrate the first and the second through holes 35 and 61.

The shield 40 is located at the inner side of the rear cover 30. A plurality of holes 41 are formed on the surface of the shield 40 to dissipate the heat. Preferably, a plurality of third through holes 42 are formed on the locations corresponding to the first and the second through holes 35 and 61.

Extended nuts 50 are inserted into the third through holes 42. FIG. 4 shows the extended nuts engaging the shield 40. The extended nut 50 comprises a cylindrical body 51 with screw thread formed on the inner periphery thereof and a head portion 53 formed integrally with lower portion of the body 51 and supporting the body 51. The extended nut 50 protrudes from the shield rearward through the third through holes 42 of the shield 50. One end of the extended nut is deformed by a method such as caulking to prevent the extended nut from detaching from the shield 40.

That is, as can be seen from FIGS. 5A–5C, outer diameter D1 of the body 51 of the extended nut 50 is formed larger than the diameter D2 of the third through holes, so that outer periphery of the extended nut is press fit into inner periphery of the third through hole 42 when the extended nut 50 is inserted into the third through hole. The head portion 53 of the extended nut 50 is formed into a semicircular form by hitting the head portion 53 by tools such as a hammer. Therefore, each of the extended nuts 50 is inserted into the third through holes 42 of the shield 40. Since the engaging screw 62 penetrating the rear cover 30 and the VESA cover 60 engages the extended nuts 50, the VESA cover 60 engages the square depression 33 of the rear cover 30.

Hereinafter, the procedure for installing the VESA cover to the rear surface of the LCD according to the present invention will be specifically described. Referring to FIG. 3 and FIGS. 5A–5C, each of the extended nuts 50 is inserted into a third through hole 42. That is, front-end portions of the extended nuts 50 are placed at the third through holes 42 and then the extended nuts 50 penetrate the third through holes 42. Since the outer diameter D1 of the body 51 of the extended nut 50 is larger than the diameter D2 of the third through hole 42, the extended nuts 50 are firmly secured to the third through holes while expanding the third through holes.

After securing the extended nuts into the third through holes 42, the head portions of the extended nuts are hit by tools such as hammer to form a semicircular form. The head portions 53 are hit until the head portions 53 of the extended nuts 50 abut a side 43 of the shield 40.

After the extended nuts are secured to the shield 40, the VESA cover 60 is placed on the square depression 33 of the rear cover 30. Thereafter, a plurality of engaging screws penetrated the first and second through holes 35, 51, inserting the screws into the inner peripheries of the body 51 of the extended nuts 50. Therefore, a plurality of securing screws 62 engages the screw formed on the inner periphery of the body 51, integrally installing the VESA cover 60 to the square depression 33 of the rear cover 30.

After installing the VESA cover 60 to the rear cover 30, the LCD monitor 10 can be placed on a desk or be hung up on a wall by rotating the handle 63.

As can be seen, since the securing structure of the VESA cover according to the present invention secures the VESA cover to the rear cover using extended nuts, the assembly procedure is simplified. Furthermore, since parts using injection molding is not formed, the cost for the production of the monitor is reduced.

What is claimed is:

1. A securing structure for a liquid crystal display monitor, comprising:

a rear cover with a depression formed on a predetermined location of the rear surface, a plurality of first through holes formed at an indented portion of the depression;

an additional cover having a plurality of second through holes formed at locations corresponding to the first through holes, said additional cover engaging the depression of the rear cover;

a shield placed at an inner side of the rear cover, said shield having a plurality of third through holes at locations corresponding to the first and the second through holes; and a plurality of extended nuts inserted into the third holes of the shield, wherein a plurality of engaging screws penetrate the first and the second through holes and engaging the extended nuts so that said additional cover is installed onto the depression of the rear cover.

2. The securing structure of claim 1, wherein said extended nut comprises a cylindrical body screw thread formed on inner periphery thereof, and a head portion protruding along outer periphery of the body, and the body of said extended nuts inserted into the through holes, securing the shield.

3. The securing structure of claim 2, wherein the outer diameter of the body of the extended nut is larger than the diameter of the third through hole so that said extended nut is contacting and expanding the inner periphery of the third through hole when the extended nut is inserted into the through hole.

4. A liquid crystal display monitor, comprising:

a liquid crystal display panel;

a shield located to the rear of the liquid crystal display panel for blocking electromagnetic radiation from the liquid crystal display panel, said shield having a through hole;

a rear cover located to the rear of said shield, said rear cover having a depression on the rear side of the rear cover and having a through hole penetrating the rear cover aligning with the through hole of the shield;

an additional cover installed in the depression of the rear cover, said additional cover having a through hole aligned with the through hole of the rear cover and the through hole of the shield;

an extended nut having a cylindrical body and having a front end with an internal axial screw thread, said extended nut being inserted through the through hole of the shield with said front end pointed toward the rear of the monitor; and an engaging screw penetrating said additional cover from the rear and engaging the screw thread of said extended nut.

5. The liquid crystal display monitor of claim 4, said extended nut further comprising:

a head formed on the end of the extended nut opposite said front end.

6. The liquid crystal display monitor of claim 4, further comprising:

the outer diameter of the cylindrical body of said extended nut being larger than the diameter of the through hole of said shield before said extended nut is inserted into the through hole of the shield.

7. The liquid crystal display monitor of claim 4, further comprising:

a portion of said extended nut protruding from said shield passing through said through hole of the rear cover.

8. The liquid crystal display monitor of claim 5, further comprising:

said head being formed integrally with said cylindrical body for supporting the cylindrical body.

9. The liquid crystal display monitor of claim 5, further comprising:

said head being formed by hammering of the head end of the extended nut.

10. The liquid crystal display monitor of claim 4, said depression of said rear cover being a square depression.

11. The liquid crystal display monitor of claim 10, further comprising:

said rear cover having a total of four through holes located near the four corners of the square depression; and said shield and said additional cover each having a total of four through holes corresponding to the four through holes of said rear cover.

12. The liquid crystal display monitor of claim 4, said additional cover further comprising a handle.

* * * * *